US008520263B2

(12) United States Patent
Takizawa et al.

(10) Patent No.: US 8,520,263 B2
(45) Date of Patent: Aug. 27, 2013

(54) IMAGE FORMING APPARATUS AND IMAGE FORMING METHOD

(75) Inventors: Naoki Takizawa, Kanagawa (JP); Ken Higuchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 320 days.

(21) Appl. No.: 11/612,087

(22) Filed: Dec. 18, 2006

(65) Prior Publication Data

US 2007/0146470 A1 Jun. 28, 2007

(30) Foreign Application Priority Data

Dec. 22, 2005 (JP) ................................ P2005-370377

(51) Int. Cl.
*H04N 1/40* (2006.01)

(52) U.S. Cl.
USPC ........... 358/3.28; 358/1.9; 347/171; 347/212; 382/100; 382/232; 382/233

(58) Field of Classification Search
USPC .......................... 358/1.9, 3.28; 347/171, 212
See application file for complete search history.

(56) References Cited

U.S. PATENT DOCUMENTS 3,640,009 A * 2/1972 Komiyama ..................... 283/88
3,650,752 A * 3/1972 Amano et al. ................ 430/139
4,756,963 A * 7/1988 Yamamoto et al. ......... 428/32.81
5,990,918 A 11/1999 Baxendale
6,861,012 B2 * 3/2005 Gardner et al. .......... 252/301.36
7,244,804 B2 * 7/2007 Ikeda et al. ................... 528/196
2001/0001472 A1 * 5/2001 Sano et al. ............... 235/462.01
2002/0030842 A1 * 3/2002 Iida .............................. 358/1.14
2002/0118377 A1 * 8/2002 Hirumi et al. .................. 358/1.7
2005/0013463 A1 * 1/2005 Reed et al. ..................... 382/100
2006/0055763 A1 * 3/2006 Matsunoshita ............... 347/107
2006/0198559 A1 * 9/2006 Manico et al. ................ 382/305
2006/0262367 A1 * 11/2006 Hattori et al. .................. 359/15
2007/0146469 A1 * 6/2007 Takizawa et al. ............. 347/212
2007/0146470 A1 * 6/2007 Takizawa et al. ............. 347/212

FOREIGN PATENT DOCUMENTS

JP HEI 04-211577 A 8/1992
JP 10-035089 A 2/1998
JP 11-263033 9/1999
JP 2000-343735 A 12/2000
JP 2001-130146 5/2001

(Continued)

OTHER PUBLICATIONS

Japanese Patent Office, Office Action issued in Patent Application JP 2005-370378, on Oct. 20, 2009.
Japanese Patent Office, Office Action issued in Patent Application JP 2005-370377, on Jan. 12, 2010.

(Continued)

*Primary Examiner* — Marivelisse Santiago Cordero
*Assistant Examiner* — Miya J Cato
(74) *Attorney, Agent, or Firm* — Dentons US LLP

(57) ABSTRACT

An image forming apparatus capable of recording image information and additional information added separately from the image information to a photographic printing medium is disclosed. The image forming apparatus includes: image information acquisition means for acquiring the image information, additional information acquisition means for acquiring the additional information, and recording means for recording the image information acquired by the image information acquisition means and the additional information acquired by the additional information acquisition means to the photographic printing medium, wherein the recording means can record the additional information by applying a transparent material that absorbs light of a specific wavelength to the area that does not absorb the light on a recording surface of the photographic printing medium.

6 Claims, 8 Drawing Sheets

(56) References Cited

FOREIGN PATENT DOCUMENTS

| | | | |
|---|---|---|---|
| JP | 2002-002126 | | 1/2002 |
| JP | 2002-240402 | | 8/2002 |
| JP | 2004-266773 | A | 9/2004 |

OTHER PUBLICATIONS

Japanese Patent Office Action corresponding to Japanese Serial No. 2005-370377 dated Apr. 26, 2011.

* cited by examiner

IMAGE FORMING APPARATUS AND IMAGE FORMING METHOD

CROSS REFERENCES TO RELATED APPLICATIONS

The present invention contains subject matter related to Japanese Patent Application JP 2005-370377 filed in the Japanese Patent Office on Dec. 22, 2005, the entire contents of which being incorporated herein by reference.

BACKGROUND OF THE INVENTION

1. Field of the Invention

The invention relates to an image forming apparatus and an image forming method capable of recording image information and additional information added separately from the image information to a photographic printing medium, particularly to an image forming apparatus and an image forming method capable of recording additional information in an invisible manner under normal conditions without compromising the photographic printing quality of image information.

2. Description of the Related Art

As an image forming apparatus, there has been known a thermal printer that uses a thermal head that faces a platen. In such a thermal printer, a plurality of heat-generating elements (for example, heat-generating resisters) linearly arranged on the thermal head are selectively energized according to grayscale levels, and heat energy generated during this process is used to record image information.

That is, after a photographic printing medium and an ink ribbon are transported to the platen, the thermal head is lowered so that the photographic printing medium and the ink ribbon are sandwiched between the platen and the thermal head. Then, the heat-generating elements on the thermal head are selectively energized and the ink on the ink ribbon is transferred onto the photographic printing medium so as to record image information.

The ink ribbon used in such a thermal printer is wound over a supply reel and a take-up reel in an ink cassette and configured such that a plurality of different color inks (for example, inks of yellow (Y), magenta (M) and cyan (C)) and a transparent laminate ink (L) are sequentially and repeatedly arranged on a base film in the direction perpendicular to the unreeling direction of the ink ribbon.

The color inks (Y, M and C) are sequentially applied to the photographic printing medium based on the image information so that the image information is recorded. On the other hand, the laminate ink (L) is provided to protect the image recorded with the color inks (Y, M and C) from ultraviolet light and includes an ultraviolet light absorber. Therefore, the laminate ink (L) is laminated over the area of the photographic printing medium where the image information has been recorded.

As thermal printers are finding application in various fields, in addition to image information, additional information is recorded in quite a few cases. That is, in recent years, thermal printers have been used in various fields, for example, for amusement and medical purposes. Their applications are not limited to simply printing for personal enjoyment but are as diverse as ID cards, passports and the like. Accordingly, in addition to image information, additional information associated or accompanied with the image information is recorded for numerous purposes, such as for preventing counterfeit and tampering, and recording photographing information, such as date and time as well as imaging conditions.

There has been proposed an image forming apparatus capable of recording image information and additional information added separately from the image information to a photographic printing medium. That is, there is disclosed an image forming method for, for example, manufacturing an ID card that provides an anti-counterfeit effect by laminating transparent plastic members, each having different thickness for each pixel, on a recorded image previously formed by using a dye (see U.S. Pat. No. 5,990,918, for example).

There has also been disclosed an image forming apparatus that provides a film-like sheet (laminate film) coating on the image information recorded surface of a photographic printing medium so as to provide difference in surface glossiness, thereby rendering additional information, such as photographing information including date and time as well as imaging conditions, invisible when viewed from the front of the photographic printing medium but visible only when viewed from an oblique direction (see JP-A-2002-240402, for example).

SUMMARY OF THE INVENTION

The technologies described in U.S. Pat. No. 5,990,918 and JP-A-2002-240402 are considered effective in that additional information other than image information can be recorded to a photographic printing medium not only without compromising the photographic printing quality of the image information but also without interfering with recording of the image information.

However, the additional information recorded by using the technologies described in U.S. Pat. No. 5,990,918 and JP-A-2002-240402 is relatively easily visible under normal conditions. When the additional information should not be easily visible or need not be visible to a third party, recording such additional information to a photographic printing medium in an easily legible manner often causes inconvenience.

For example, when the recorded additional information is a shop reference product number for recording image information, information on addresses of a recording device on which image information is saved, a URL of a sender's personal webpage added on a printed postcard, or a URL of an advertisement website for a specific user, the additional information is preferably recorded to a photographic printing medium such that it is not easily legible under normal conditions.

Accordingly, when image information together with additional information that should not or need not be visible to a third party has to be recorded to a photographic printing medium, there is a need for recording the additional information in an invisible manner under normal conditions without compromising the photographic printing quality of the image information.

Therefore, it is desirable to provide an image forming apparatus and an image forming method for recording image information to a photographic printing medium, in which when image information and additional information added separately from the image information is recorded, the additional information is not easily legible under normal conditions but is legible under certain conditions.

According to an embodiment of the invention, there is provided an image forming apparatus capable of recording image information and additional information added separately from the image information to a photographic printing medium. The image forming apparatus includes image information acquisition means for acquiring the image information, additional information acquisition means for acquiring the additional information, and recording means for recording the image information acquired by the image information acquisition means and the additional information acquired by the additional information acquisition means to the photographic printing medium. The recording means can record the additional information by applying a transparent material that absorbs light of a specific wavelength to the area that does not absorb the light on a recording surface of the photographic printing medium.

According to another embodiment of the invention, there is provided an image forming method for recording image information and additional information added separately from the image information to a photographic printing medium. The method includes the steps of acquiring the image information and the additional information, and recording the acquired image information to a recording surface of the photographic printing medium and recording the acquired additional information by applying a transparent material that absorbs light of a specific wavelength to the area that does not have the image information recorded thereon and does not absorb the light on the recording surface of the photographic printing medium.

In the invention, additional information added separately from image information is recorded by applying a transparent material that absorbs light of a specific wavelength to an area that does not absorb light of the specific wavelength on the recording surface of a photographic printing medium. That is, for example, the image information is recorded on a photographic printing medium containing a fluorescent brightener, while the additional information is recorded with a laminate ink containing an ultraviolet absorber on an area where no image information has been recorded.

Accordingly, the additional information recorded with the laminate ink is transparent under normal conditions, so that the additional information is illegible. However, when the additional information is exposed to ultraviolet light, for example, by using a black light, the portion where the laminate ink has been applied absorbs the ultraviolet light while the portion where no laminate ink has been applied appears to emit light due to the ultraviolet light, thereby rendering the additional information legible.

According to an embodiment of the invention, although additional information is illegible under normal conditions in which the additional information is not exposed to light of a specific wavelength, the additional information becomes easily legible under certain conditions in which the additional information is exposed to light of the specific wavelength.

Therefore, when image information together with additional information that should not or need not be visible to a third party has to be recorded to a photographic printing medium, the additional information can be recorded in an invisible manner under normal conditions. Furthermore, the additional information is recorded with a transparent material, so that the photographic printing quality of the image information will not be compromised.

DESCRIPTION OF THE PREFERRED EMBODIMENTS

An embodiment of the invention will be described below with reference to the drawings and the like. In this embodiment, a thermal printer will be described as an example of an image forming apparatus.

Figure 1:
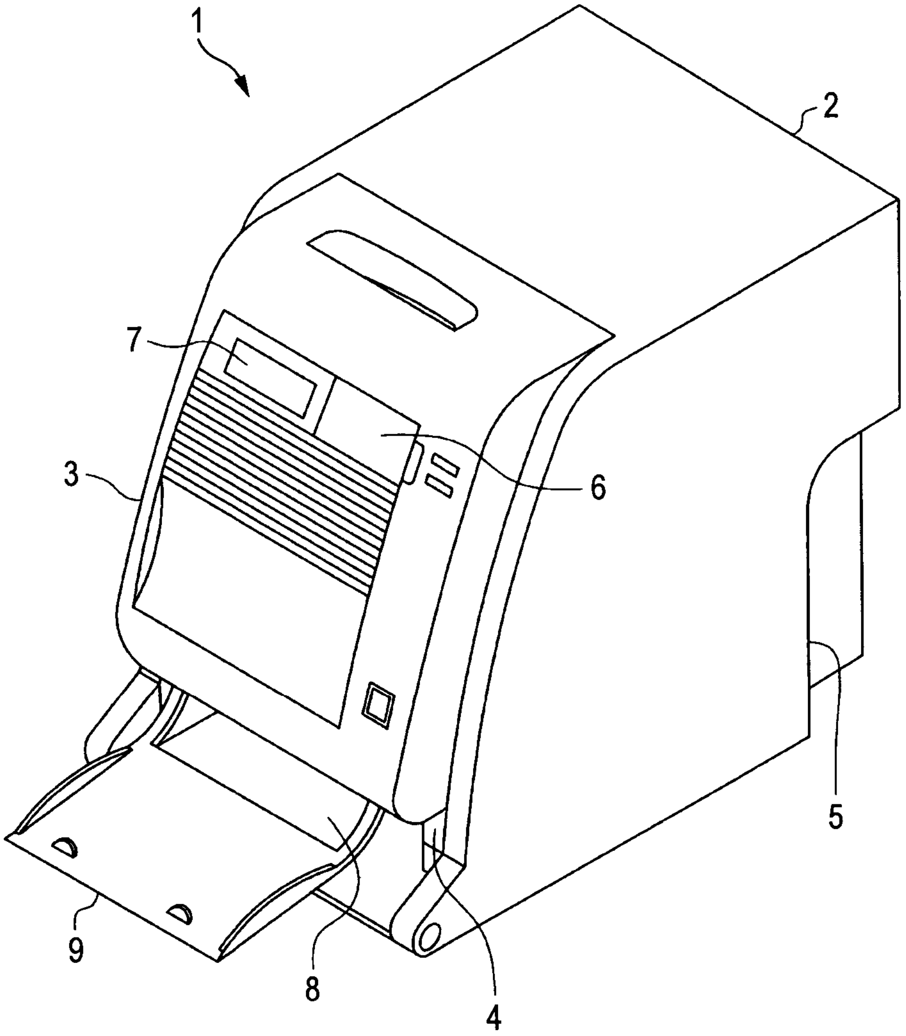
FIG. 1 is a perspective view showing the thermal printer according to the embodiment.

FIG. 1 is a perspective view showing the thermal printer 1 according to this embodiment.

As shown in FIG. 1, the thermal printer 1 includes an enclosure 2 and a door 3 attached to the front side of the enclosure 2. A sheet ejection port 8 is formed at the lower part of the door 3, and a sheet ejection tray 9 is attached to the sheet ejection port 8.

A power switch 4 is provided on the front side of the enclosure 2. An interface 5 (corresponding to the image information acquisition means and the additional information acquisition means according to the embodiment of the invention) formed of a plurality of connectors for external connection is disposed on the rear side of the enclosure 2. The interface 5 allows obtaining image information, additional information and the like from an external apparatus, such as a computer. That is, image information, additional information and the like can be acquired in online processing via a communication cable. Alternatively, image information, additional information and the like can be read out via various recording media, such as a magnetic disk, an optical disk and a memory card.

An operation panel 6 for inputting or selecting additional information (corresponding to the additional information input means according to the embodiment of the invention) is provided at the upper part of the door 3. That is, the thermal printer 1 according to this embodiment is designed to acquire additional information not only from the interface 5 but also by allowing the user himself/herself to input additional information or arbitrarily select and specify additional information from multiple pieces of pre-stored additional information. The additional information acquired from the interface 5 or inputted or selected from the operation panel 6 as well as various other messages are displayed on a liquid crystal panel 7.

As described above, the thermal printer 1 according to this embodiment is provided with a man-machine interface formed of the operation panel 6 for inputting or selecting additional information and the liquid crystal panel 7 for displaying the additional information, messages and the like. The way additional information is inputted is not limited thereto, but a keyboard, a pointing device or the like may be additionally used. A CRT or the like may also be used for displaying additional information and the like.

Figure 2:
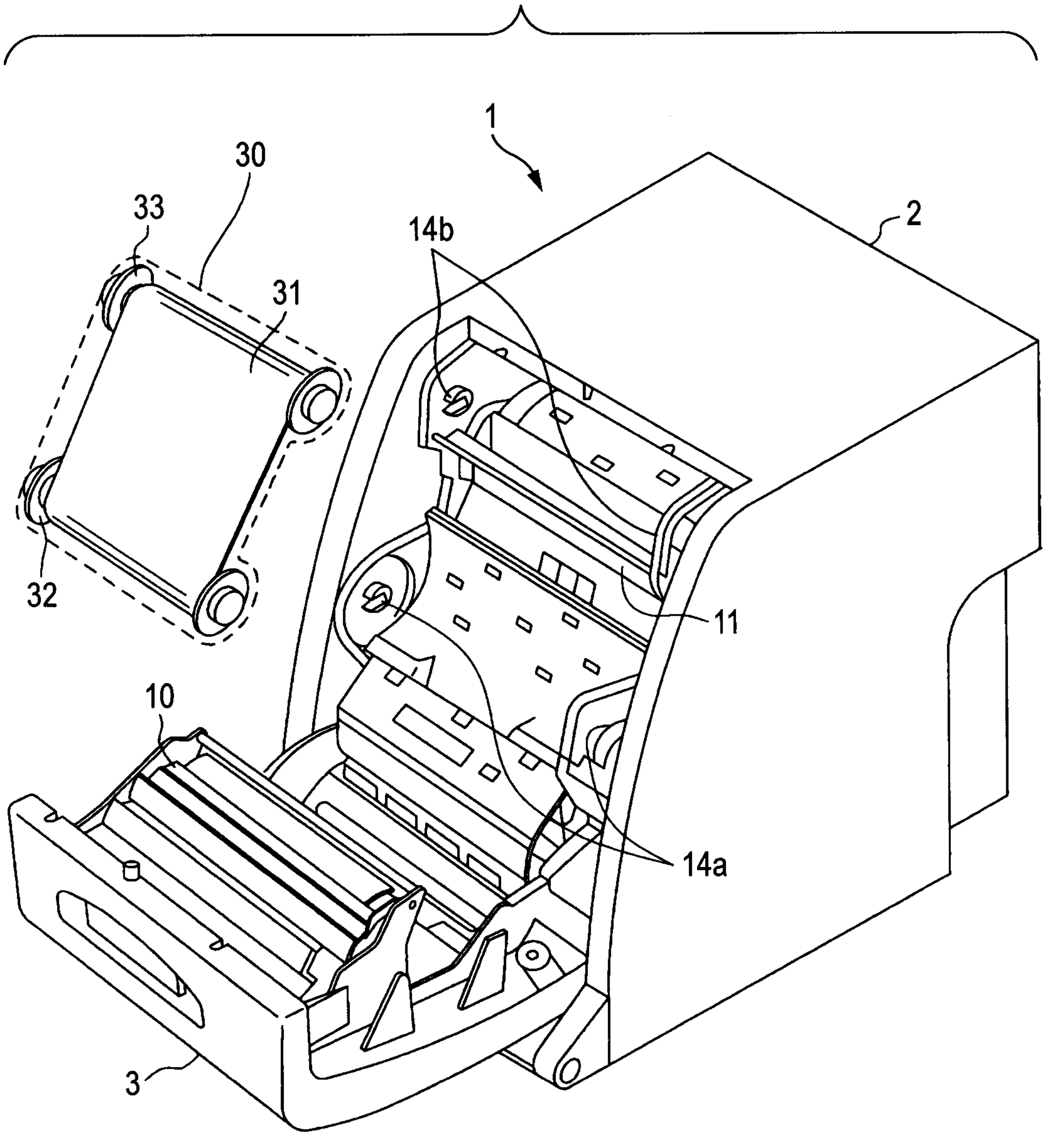
FIG. 2 is a perspective view of the thermal printer according to the embodiment shown in FIG. 1, with the door open and the ink cassette removed.

FIG. 2 is a perspective view of the thermal printer 1 according to this embodiment shown in FIG. 1, with the door 3 open and an ink cassette 30 removed. The ink cassette 30 is shown with the outline drawn by a dotted line for clearly showing the internal structure.

Figure 3:
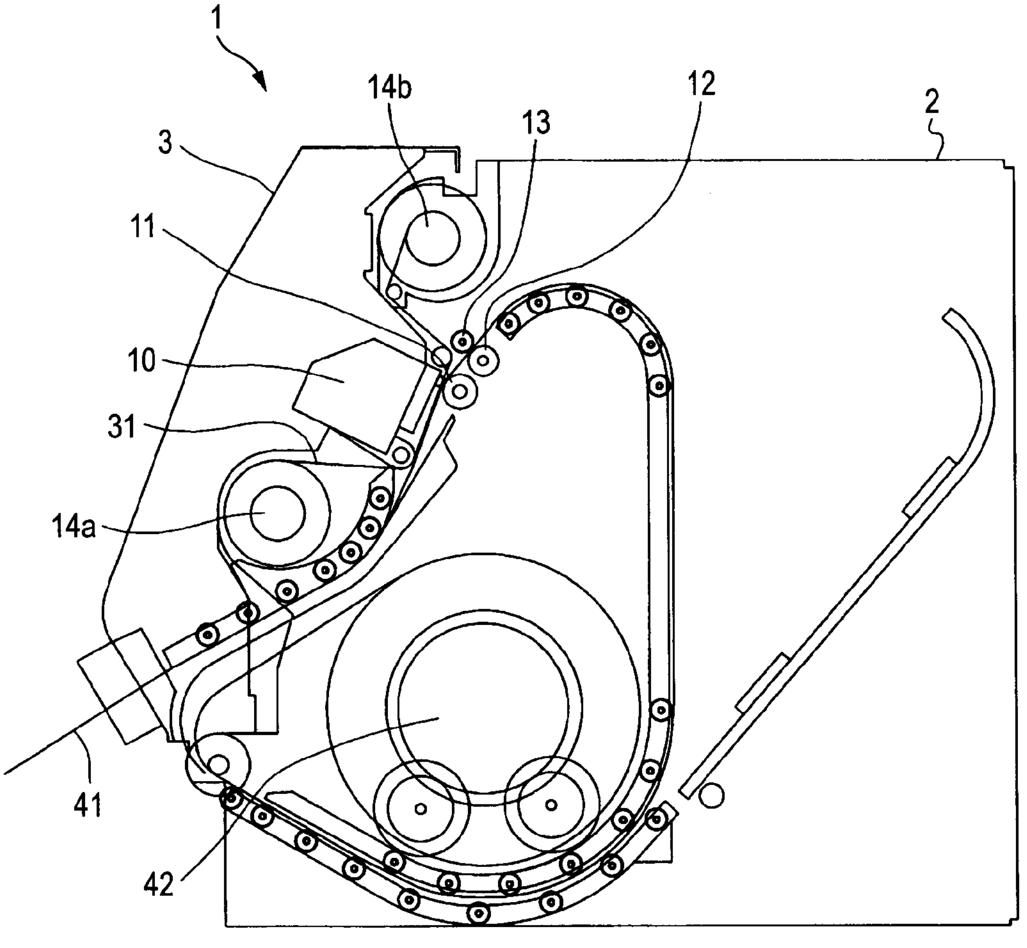
FIG. 3 is a side view showing the internal structure of the thermal printer according to the embodiment shown in FIG. 1.

FIG. 3 is a side view showing the internal structure of the thermal printer 1 according to this embodiment shown in FIG. 1.

As shown in FIGS. 2 and 3, a thermal head 10 (corresponding to the recording means according to the embodiment of the invention) is mounted on the back side of the door 3. A platen 11 is disposed in the enclosure 2 at a position opposite to the thermal head 10 when the door 3 is closed. A reel drive unit 14*a* for rotating a supply reel 32 in the ink cassette 30 is provided under the platen 11, and a reel drive unit 14*b* for rotating a take-up reel 33 in the ink cassette 30 is provided above the platen 11.

When the ink cassette 30 is mounted in the enclosure 2, the supply reel 32 and the take-up reel 33 are disposed parallel to the platen 11 and an ink ribbon 31 is placed such that it passes above the platen 11. When the door 3 is closed, the ink ribbon 31 is placed between the platen 11 and the thermal head 10. When the reel drive unit 14*b* is rotated in this state, the ink ribbon 31 is wound onto the take-up reel 33. Conversely, when the reel drive unit 14*a* is rotated, the ink ribbon 31 is wound back onto the supply reel 32.

A roll of paper 41 (corresponding to the photographic printing medium according to the embodiment of the invention) is mounted in the enclosure 2. The roll of paper 41 is made of photographic printing paper fabricated by applying a dye reception layer composition to synthetic paper on a base sheet and curing the resultant product. The recording surface of the roll of paper 41 is coated with a fluorescent brightener for emphasizing white.

The roll of paper 41 is formed by winding the photographic printing paper onto a paper holder 42 in a cylindrical manner with the recording surface facing upward. The unreeled roll of paper 41 passes between a capstan roller 12 and a pinch roller 13 provided in the vicinity of the platen 11 and is ejected after passing between the platen 11 and the thermal head 10. Thus, by rotating the capstan roller 12 in the forward and reverse directions as necessary, the roll of paper 41 is transported in the forward and backward directions.

The thermal head 10 is provided with a plurality of heat-generating resisters linearly arranged in the width direction (line direction) of the roll of paper 41. Heat energy generated when these heat-generating resisters are energized is used to transfer color inks applied on the surface of the ink ribbon 31 onto the recording surface of the roll of paper 41 so as to record image information.

Figure 4:
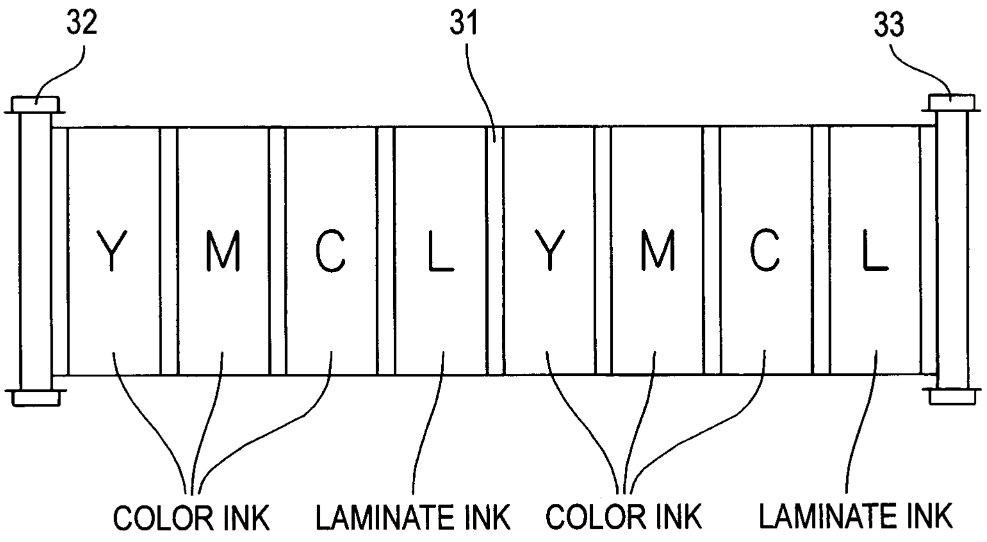
FIG. 4 is a plan view showing the ink ribbon used in the thermal printer according to the embodiment.

FIG. 4 is a plan view showing the ink ribbon 31 used in the thermal printer 1 according to this embodiment.

As shown in FIG. 4, the ink ribbon 31 is wound over the supply reel 32 and the take-up reel 33 in the ink cassette 30 (see FIG. 2) and configured such that color inks of yellow (Y), magenta (M) and cyan (C) as well as a transparent laminate ink (L) are sequentially and repeatedly arranged on a base film in the direction perpendicular to the unreeling direction of the ink ribbon 31.

The laminate ink (L) is made of thermoplastic resin with an ultraviolet absorber added thereto. The laminate ink (L) is inherently laminated over an image information recorded area formed by transferring the color inks (Y, M and C) so as to protect the recorded image from ultraviolet light and the like and improve light fastness.

At the same time, the laminate ink (L) corresponds to the transparent material according to the embodiment of the invention. That is, in the thermal printer 1 according to this embodiment, the laminate ink (L) containing an ultraviolet absorber is applied on the fluorescent brightener-containing recording surface of the roll of paper 41 (see FIG. 3), allowing additional information added separately from image information to be recorded.

Next, a description will be made of how image information and additional information is recorded by using the ink ribbon 31 shown in FIG. 4.

Figure 5:
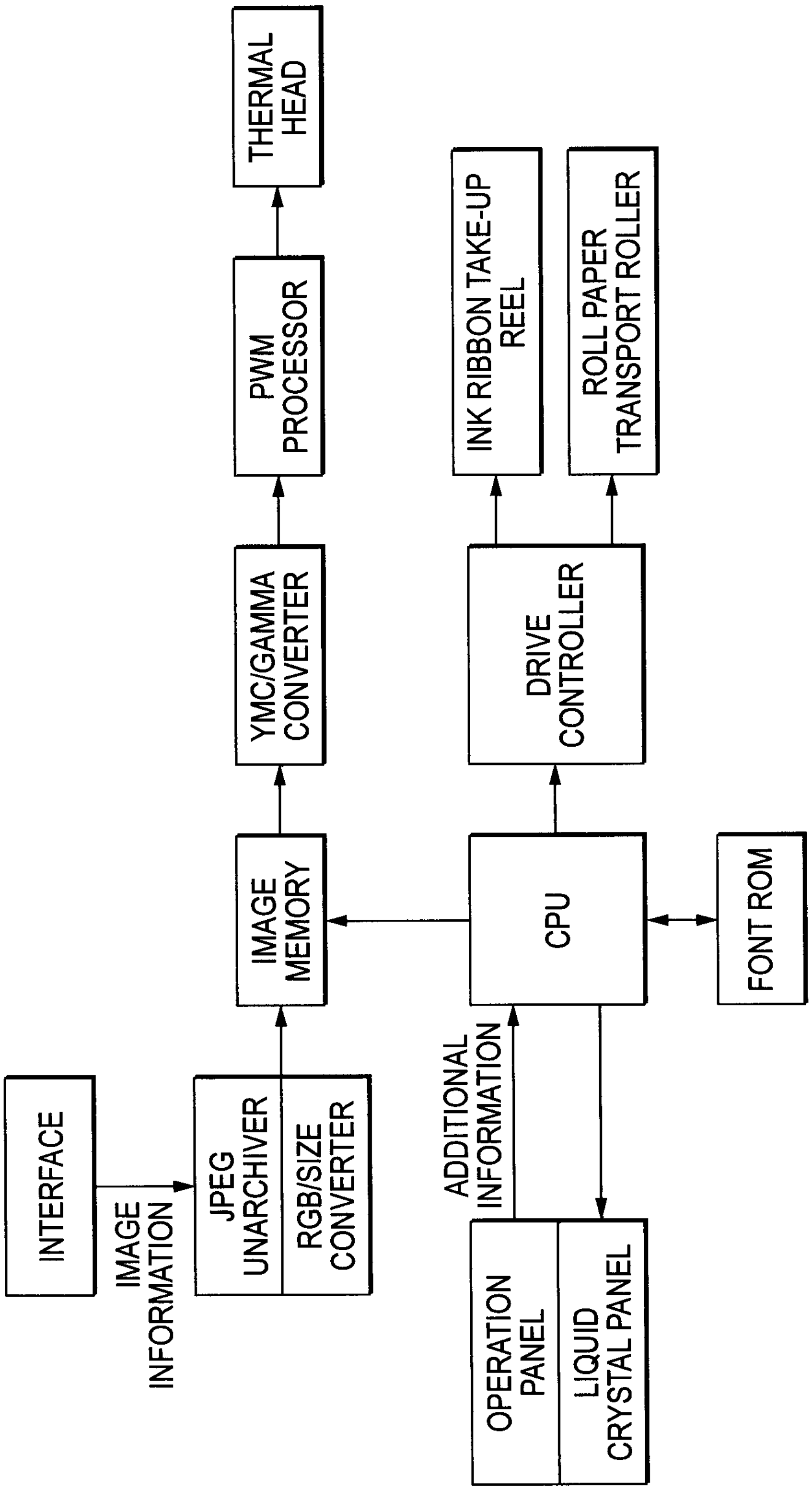
FIG. 5 is a block diagram showing the main part of the circuit configuration for recording image information and additional information in the thermal printer according to the embodiment.

FIG. 5 is a block diagram showing the main part of the circuit configuration for recording image information and additional information in the thermal printer 1 according to this embodiment.

To record image information, the image information is first acquired through the interface (the interface 5 shown in FIG. 1), as shown in FIG. 5. The image information acquired from the interface is sent to a JPEG unarchiver and an RGB/size converter via a predetermined signal line.

That is, when the image information is compressed in the JPEG format, the image information is unarchived, converted into data of Y (brightness), Cb and Cr (color difference), and converted into a recording size in the RGB/size converter. Then, primary-color data of R (red), G (green) and B (blue) are stored in an image memory. On the other hand, when the image information is not compressed, the image information is converted into a recording size in the RGB/size converter, and the primary-color data are stored in the image memory. In unarchiving and converting processes, a buffer memory (not shown) is used as a work area.

To record additional information, the additional information is first inputted or selected from the operation panel (the operation panel 6 shown in FIG. 1). The additional information acquired by the inputting or selecting operation is sent to a CPU (central processing unit) via a predetermined signal line. Then, the CPU refers to data stored in a font ROM (read only memory) provided in the CPU to convert the additional information into bitmap data. The CPU then displays the additional information on the liquid crystal panel (the liquid crystal panel 7 shown in FIG. 1) and stores the converted bitmap data in the image memory. The additional information can also be acquired from the interface as in the case of image information.

The image information and the additional information corresponding to one screen thus stored in the image memory is read out and sent to an YMC/gamma converter, undergoes a color conversion process in which the primary color system (R (red), G (green) and B (blue)) is converted into the complementary color system (Y (yellow), M (magenta) and C (cyan)), undergoes a gamma conversion (concentration conversion) process, and is sent to the thermal head (the thermal head 10 shown in FIG. 3) via a PWM (pulse width modulation) processor.

The CPU controls the ink ribbon take-up reel (the take-up reel 33 for the ink ribbon 31 shown in FIG. 2) and the roll paper transport roller (the capstan roller 12 for transporting the roll of paper 41 shown in FIG. 3) via a drive controller.

Figure 6:
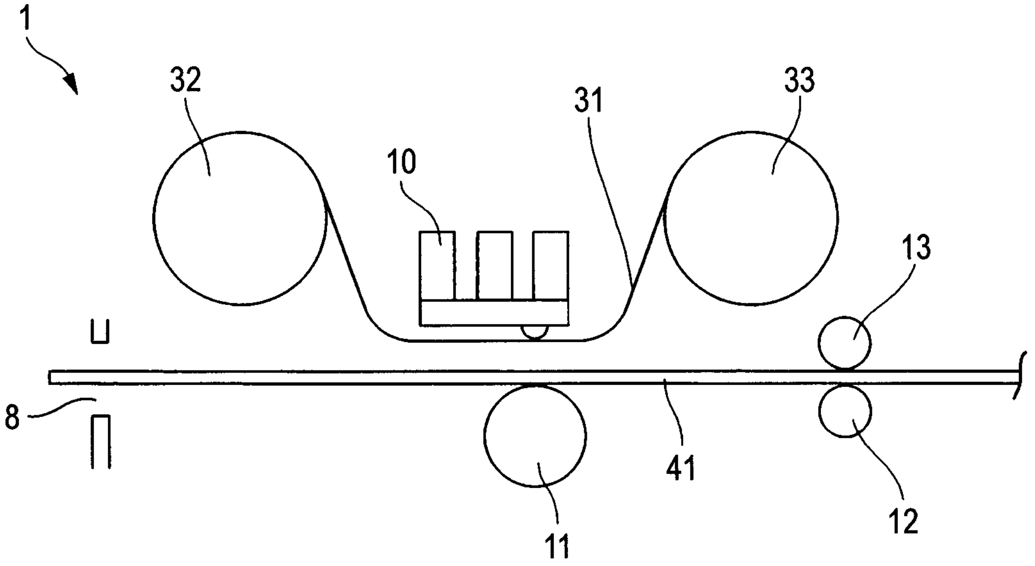
FIG. 6 is a conceptual view showing a method for recording image information and additional information in the thermal printer according to the embodiment.

FIG. 6 is a conceptual view showing a method for recording image information and additional information in the thermal printer 1 according to this embodiment.

As shown in FIG. 6, the reel drive unit 14*b* (see FIG. 3) controlled by the drive controller (see FIG. 5) rotates the take-up reel 33 to unreel the ink ribbon 31 from the supply reel 32. The unreeled ink ribbon 31 passes between the thermal head 10 and the platen 11 and is wound onto the take-up reel 33.

The roll of paper 41 is sandwiched between the capstan roller 12 and the pinch roller 13, and the capstan roller 12 controlled by the drive controller (see FIG. 5) is rotated to unreel the roll of paper 41 from the paper holder 42 (see FIG. 3). The unreeled roll of paper 41 is then transported between the ink ribbon 31 and the platen 11.

When the photographic printing is not in process, the thermal head 10 is lifted and situated at a position slightly separate from the platen 11. When the image information and additional information is sent, the lifted thermal head 10 is lowered and presses the platen 11, and the ink ribbon 31 and the roll of paper 41 are sandwiched between the heat-generating resisters arranged on the thermal head 10 and the platen 11. That is, the heat-generating resisters on the thermal head 10 firmly press the roll of paper 41 via the ink ribbon 31 on the platen 11.

Clockwise rotation of the capstan roller 12 sequentially transports the roll of paper 41 in the direction (the rightward direction in FIG. 6) in which the roll of paper 41 is wound back onto the paper holder 42 (see FIG. 3), and clockwise rotation of the take-up reel 33 sequentially winds the ink ribbon 31 onto the take-up reel 33 at the same speed and in the same direction as the roll of paper 41. At the same time, the heat-generating resisters arranged on the thermal head 10 are selectively energized based on the image information and heat energy is transferred from the heat-generating resisters to the ink ribbon 31. According to the amount of generated heat from the heat-generating resisters on the thermal head 10, the Y (yellow) color ink on the ink ribbon 31 shown in FIG. 4 is transferred onto the fluorescent brightener-containing roll of paper 41.

Thereafter, the thermal head 10 is lifted and the capstan roller 12 is counter-rotated (rotated in the counterclockwise direction) to feed the roll of paper 41 in the reverse direction (the leftward direction in FIG. 6). After the roll of paper 41 is returned to the point where the photographic printing has initiated, a similar recording operation described above is repeated. In this way, the magenta (M) and cyan (C) color inks on the ink ribbon 31 shown in FIG. 4 are also transferred onto the roll of paper 41, and the color image information is sharply recorded on the fluorescent brightener-containing roll of paper 41.

After the roll of paper 41 is fed again in the reverse direction, a similar recording operation described above is repeated to transfer the transparent laminate ink (L) on the ink ribbon 31 shown in FIG. 4 onto the roll of paper 41. In this way, the ultraviolet absorber-containing laminate ink (L) is laminated over the image information recorded area on the roll of paper 41, so as to protect the recorded image from ultraviolet light and improve the light fastness of the recorded image.

The additional information is recorded on the roll of paper 41 in such a way that the laminate ink (L) is partially transferred according to the additional information onto the area of the roll of paper 41 where no image information has been recorded. That is, the additional information is recorded with the ultraviolet absorber-containing laminate ink (L) on the area of the fluorescent brightener-containing roll of paper 41 where color inks (yellow (Y), magenta (M) and cyan (C)) have not been transferred.

The roll of paper 41 on which the image information and the additional information has been thus recorded is transported toward the sheet ejection port 8 by lifting the thermal head 10 and counter-rotating the capstan roller 12 (rotating in the counterclockwise direction). Then, the area of the roll of paper 41 where the image information and the additional information has been recorded is cut by a cutter (not shown), and ejected from the sheet ejection port 8.

Figure 7A:
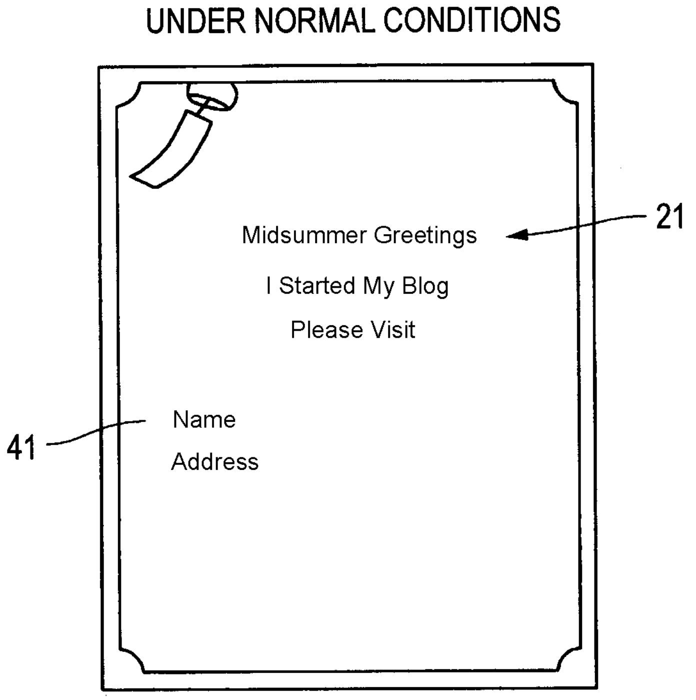
FIGS. 7A and 7B are plan views showing one example of image information and additional information recorded by the thermal printer according to the embodiment.
Figure 7B:
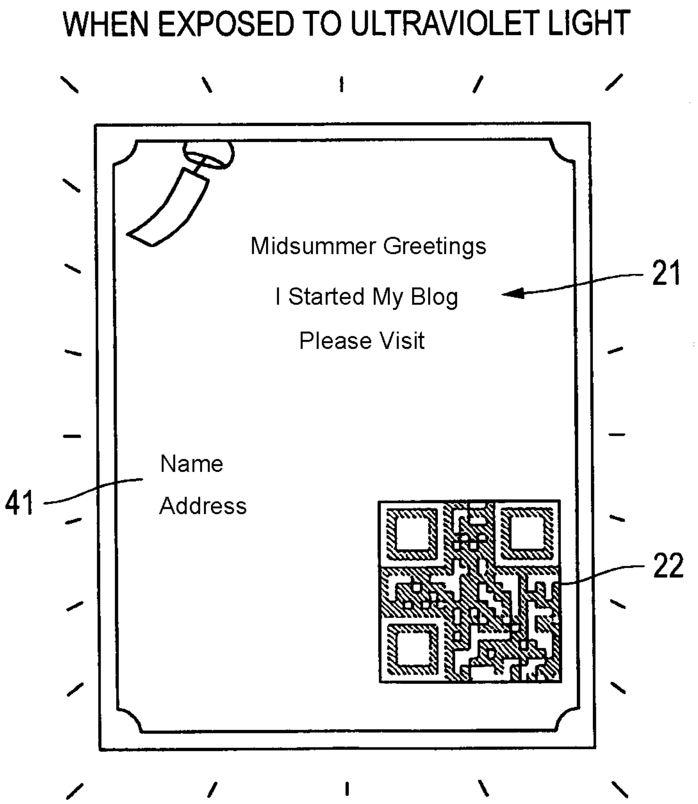

FIGS. 7A and 7B are plan views showing one example of image information 21 and additional information 22 recorded by the thermal printer 1 according to this embodiment.

As show in FIGS. 7A and 7B, a greeting sentence for the hot season, the address and the name of the sender, a figure of a wind-bell and the like are recorded as the image information 21 on the recording surface of the roll of paper 41 cut into the size of a postcard. A two-dimensional code representing a URL of a sender's personal webpage is recorded as the additional information 22 on the area where the image information 21 has not been recorded.

Since the additional information 22 has been recorded with the transparent laminate ink (L), the additional information 22 is illegible to a third party under normal conditions. That is, as shown in FIG. 7A, the roll of paper 41 under normal conditions appears to have only the image information 21 recorded thereon. Thus, under normal visible light conditions, such as during delivery, the additional information 22, which is the URL of a sender's personal webpage, will not be disclosed to a third party.

However, when the roll of paper 41 is exposed to ultraviolet light, for example, by using a black light, the additional information 22 becomes legible. That is, when the roll of paper 41 is exposed to ultraviolet light as shown in FIG. 7B, the area on the fluorescent brightener-containing roll of paper 41 where the image information 21 has not been recorded emits light and appears generally bright. On the other hand, the additional information 22 recorded with the ultraviolet absorber-containing laminate ink (L) appears dark because the applied ultraviolet light is absorbed. Thus, the recipient of the postcard can illuminate the postcard with ultraviolet light, for example, by using a black light to read the additional information 22 that appears dark against the bright, light-emitting area where the image information 21 has not been recorded.

Figure 8A:
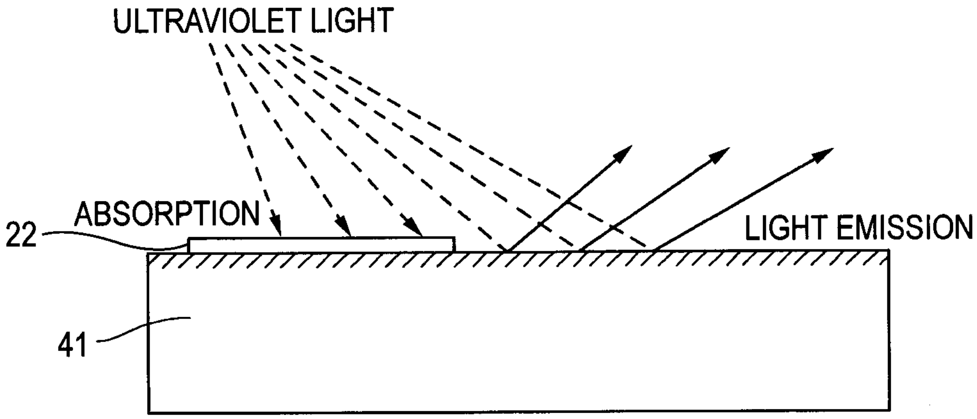
FIGS. 8A and 8B explain a method for reading additional information recorded by the thermal printer according to the embodiment.
Figure 8B:
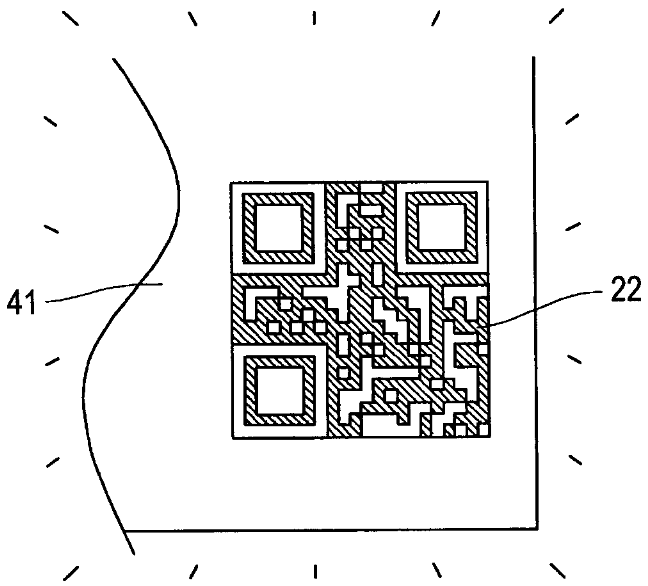

FIGS. 8A and 8B explain a method for reading additional information 22 recorded by the thermal printer 1 according to this embodiment.

As shown in FIG. 8A, the additional information 22 is recorded with the ultraviolet absorber-containing laminate ink (L) on the area on the roll of fluorescent brightener-coated paper 41 where the image information 21 (see FIGS. 7A and 7B) has not been recorded.

When such a roll of paper 41 is exposed to ultraviolet light from above, as shown in FIG. 8A, the additional information 22 on the roll of paper 41 on which the laminate ink (L) has been transferred appears dark because the ultraviolet light is absorbed due to the effect of the ultraviolet absorber added to the laminate ink (L). On the other hand, at the portion on which no laminate ink (L) has been transferred and the image information 21 (see FIGS. 7A and 7B) has not been recorded, the roll of paper 41 is not blocked by the image information 21 but is exposed, so that that portion emits light and appears bright because the ultraviolet light is reflected due to the effect of the fluorescent brightener (the hatched portion in the figure) coated on the roll of paper 41.

Thus, as shown in FIG. 8B, at the portion of the roll of paper 41 on which no laminate ink (L) has been transferred, the roll of paper 41 emits light and appears bright due to the ultraviolet light, while the portion on which the laminate ink (L) has been transferred to record the additional information 22 appears dark because the laminate ink (L) absorbs the ultraviolet light. Therefore, the additional information 22 becomes legible because of the contrast in brightness.

In this way, according to the thermal printer 1 of this embodiment, the image information 21 (see FIGS. 7A and 7B) is sharply recorded on the roll of fluorescent brightener-coated paper 41, while the additional information 22 is recorded with the transparent ultraviolet absorber-containing laminate ink (L) on the area where the image information 21 has not been recorded. As a result, the additional information

22, such as a URL of a sender's personal webpage, can be recorded in an invisible manner under normal conditions without compromising the photographic printing quality of the image information 21. The additional information 22 easily becomes legible by exposing it to ultraviolet light, for example, by using a black light.

Although the embodiment of the invention has been described above, the invention is not limited thereto. For example, the following various variations are possible:

(1) Although the embodiment has been described with reference to the thermal printer 1 as an image forming apparatus, the image forming apparatus is not limited to the thermal printer 1. That is, the invention can be applied to various image forming apparatuses, such as printers and copying machines of other types. Although the roll of paper 41 is used as the photographic printing medium, the photographic printing medium is not limited thereto. For example, the photographic printing medium may be a cut sheet and the like.

(2) In this embodiment, although the additional information 22 is recorded to the fluorescent brightener-containing roll of paper 41 with the transparent ultraviolet absorber-containing laminate ink (L), the way the additional information 22 is recorded is not limited thereto. For example, the additional information 22 may be recorded by applying a transparent material that absorbs light of a specific wavelength to an area that does not absorb light of the specific wavelength on the recording surface of the photographic printing medium. That is, for example, the additional information 22 may be recorded with a transparent material that absorbs infrared light or the like. Since the fluorescent brightener-containing roll of paper 41 and the transparent ultraviolet absorber-containing laminate ink (L) are universally used, use of these materials provides economical superiority.

(3) Conceivable additional information 22 is not limited to a URL of a sender's personal webpage, but may include any information that should not be easily visible or need not be visible to a third party under normal conditions. For example, URLs of websites for providing advertising campaigns and various services are displayed in magazines, on street posters and the like, so that users can start a dedicated application stored in a mobile phone that support two-dimensional codes so as to take a close-in shot of a two-dimensional code. Then, a URL for a mobile phone browser is displayed on the liquid crystal screen of the mobile phone, and the user can select the URL to access the corresponding website. Therefore, by recording such a URL as additional information 22, a specific user can access the corresponding website.

(4) The additional information 22 is not limited to an URL but may be a reference product number for a printout, information on addresses of a recording device on which image information is saved or the like. Furthermore, the additional information 22 is not limited to a two-dimensional code, but may be a one-dimensional code or the like in which a barcode (JAN code) is included in the horizontal direction.

It should be understood by those skilled in the art that various modifications, combinations, sub-combinations and alterations may occur depending on design requirements and other factors insofar as they are within the scope of the appended claims or the equivalents thereof.

What is claimed is:

1. An image forming apparatus comprising:

a recording section that records image information and additional information directly onto a recording surface of a photographic printing medium, the recording surface including a first area and a second area, the recording section (i) recording no image information on the first area of the recording surface and (ii) recording the image information on the second area of the recording surface, and the photographic printing medium containing a fluorescent brightener in at least the first area of the recording surface, wherein, the recording section is configured such that the recording section (i) laminates a visually transparent laminate ink that contains an ultraviolet light absorber over the second area of the recording surface that has the image information recorded thereon so that the visually transparent laminate ink is laminated over the recorded image information and (ii) uses the visually transparent laminate ink to record the additional information by partially applying the visually transparent laminate ink according to the additional information onto the first area of the recording surface that has no image information recorded thereon and that contains the fluorescent brightener, and the additional information includes a two-dimensional code representing a URL of a website, the two-dimensional code being readable by a mobile phone.

2. The image forming apparatus according to claim 1, wherein the image forming apparatus is a thermal printer.

3. The image forming apparatus according to claim 1, wherein the recording section records the image information on the second area of the recording surface with color inks.

4. The image forming apparatus according to claim 1, further comprising an information acquisition section capable of acquiring the image information and the additional information from an external apparatus.

5. An image forming method, the method comprising the steps of:

recording image information and additional information directly onto a recording surface of a photographic printing medium, the recording surface including a first area on which no image information is being recorded and a second area on which the image information is being recorded, and the photographic printing medium containing a fluorescent brightener in at least the first area of the recording surface, wherein, (a) recording the image information and the additional information includes (i) recording the image information on the second area of the recording surface, (ii) laminating a visually transparent laminate ink that contains an ultraviolet light absorber over the second area of the recording surface on which the image information has been recorded so that the visually transparent laminate ink is laminated over the recorded image information, and (iii) using the visually transparent laminate ink to record the additional information by partially applying the visually transparent laminate ink according to the additional information onto the first area of the recording surface on which no image information has been recorded and that contains the fluorescent brightener, and (b) the additional information includes a two-dimensional code representing a URL of a website, the two-dimensional code being readable by a mobile phone.

6. The image forming method according to claim 5, wherein:

the image information is recorded by applying color inks to the second area of the recording surface based on the image information, and the color inks are protected by the visually transparent laminate ink laminated over the recorded image information.

* * * * *